Figures 1, 2:
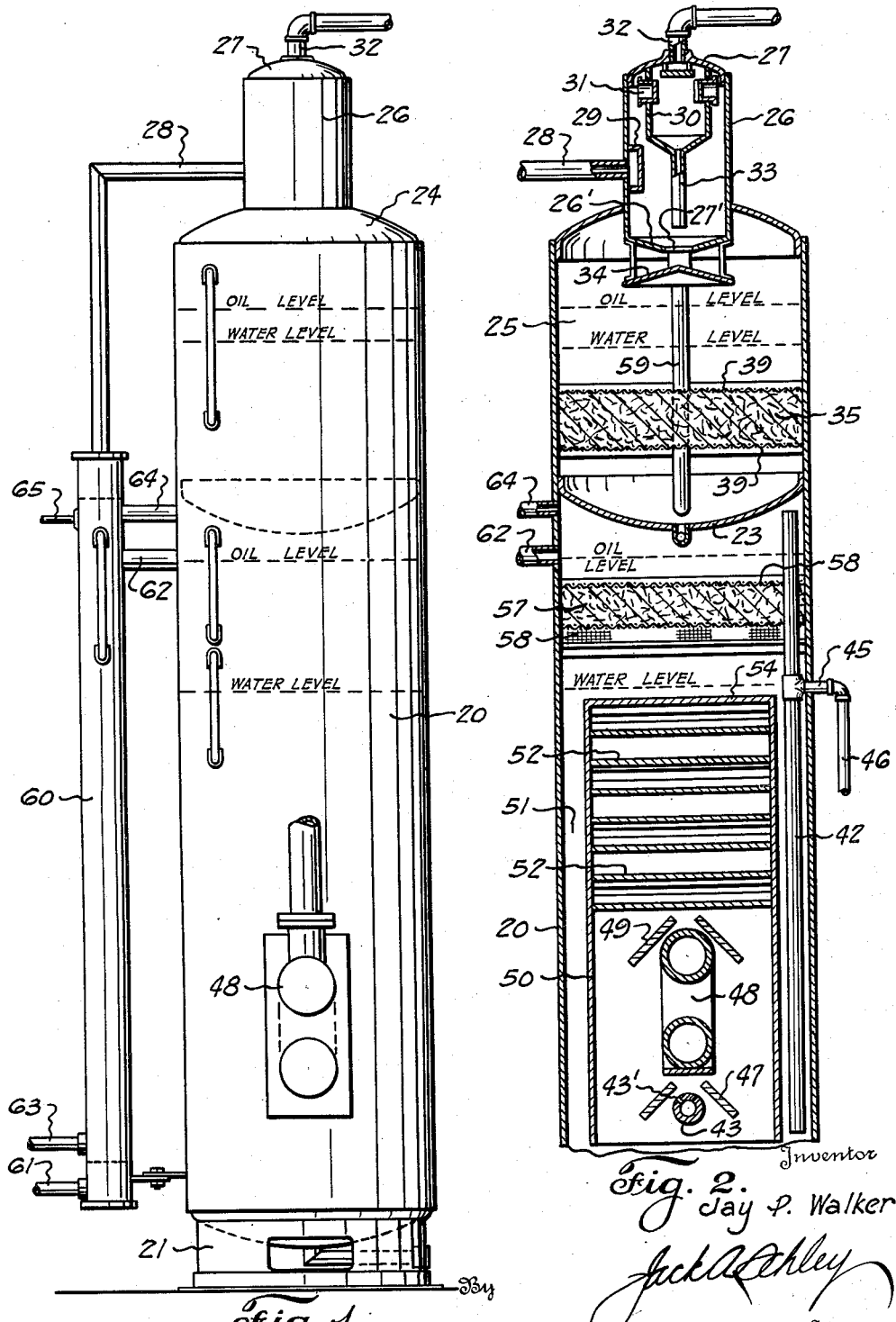

Sept. 29, 1942.　　　J. P. WALKER　　　2,297,297
TREATMENT OF OIL, GAS, AND WATER MIXTURES
Filed May 27, 1940　　　5 Sheets-Sheet 1

Inventor
Jay P. Walker
By Jack A. Ashley
Attorney

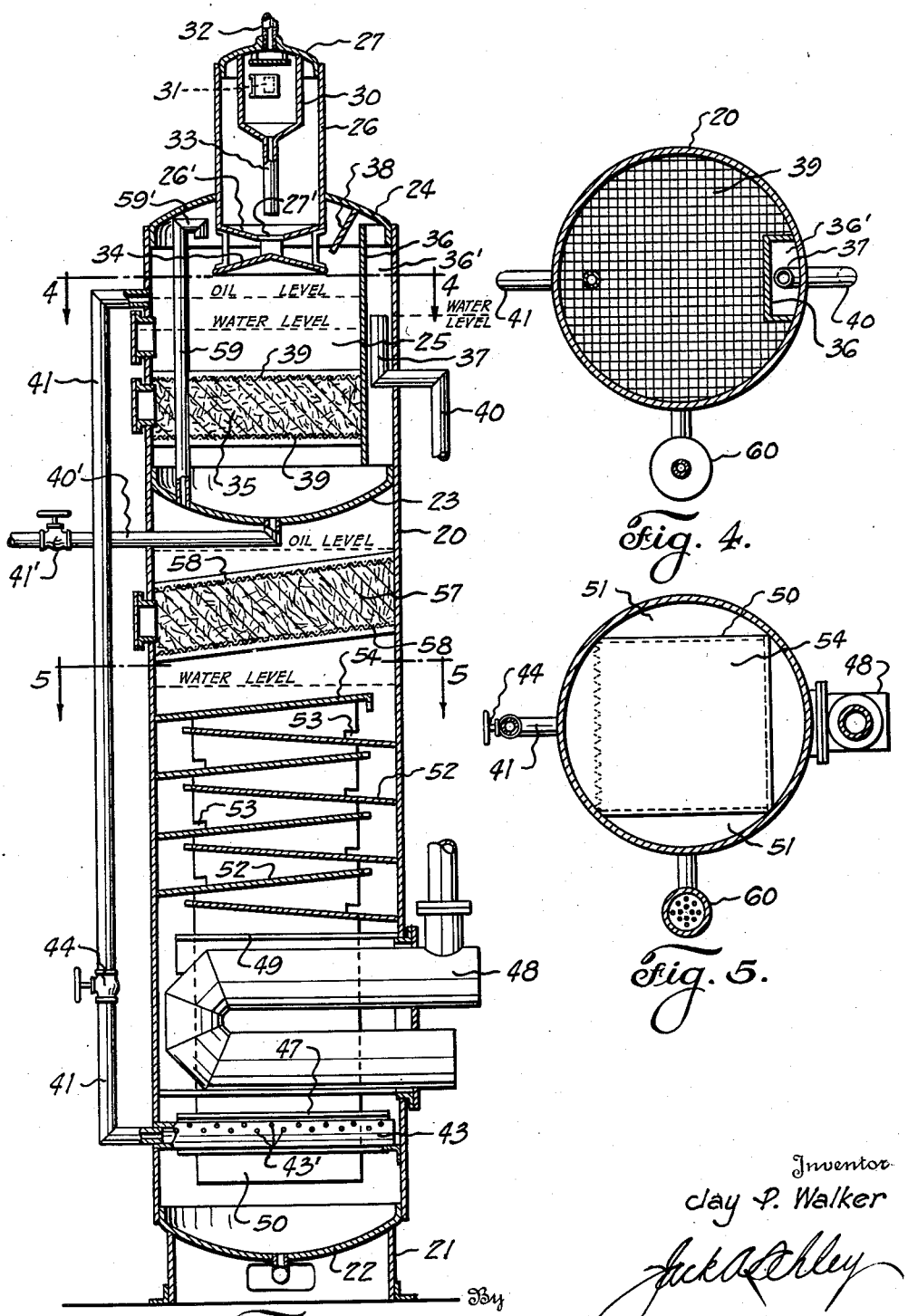

Inventor
Jay P. Walker

Sept. 29, 1942. J. P. WALKER 2,297,297
TREATMENT OF OIL, GAS, AND WATER MIXTURES
Filed May 27, 1940 5 Sheets—Sheet 4

Inventor
Jay P. Walker
By Jack A. Ashley
Attorney

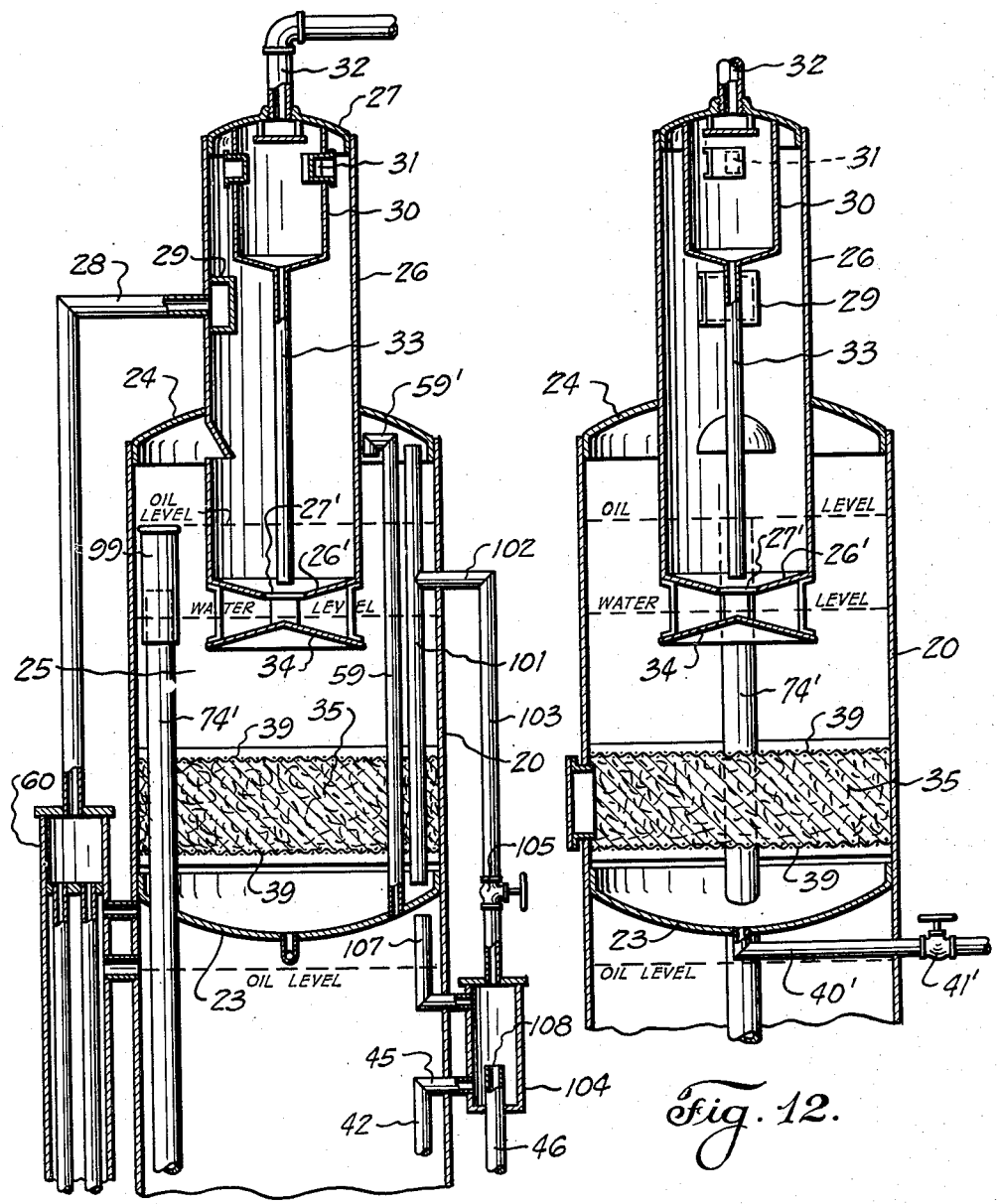

Patented Sept. 29, 1942

2,297,297

UNITED STATES PATENT OFFICE 2,297,297

TREATMENT OF OIL, GAS, AND WATER MIXTURES

Jay P. Walker, Tulsa, Okla., assignor of forty per cent to Guy O. Marchant and six per cent to C. G. Wells, both of Tulsa, Okla.

Application May 27, 1940, Serial No. 337,405

33 Claims. (Cl. 183—2.7)

This invention relates to new and useful improvements in the treatment of oil, gas and water mixtures.

In the majority of fields where oil and gas are being produced, the producing formations, whether they be of porous limestone or porous sandstone, are usually partially filled with salt water, mostly found in the outer or lower lying edges of the area or field structure proper, and in some cases, the water may be found to underlie the entire field when it first becomes productive; some wells, when originally drilled into the pay formation, may produce salt water at once with the oil and gas. The encroachment of the salt water during the life of most oil fields is almost certain, and on account of there being no practical method yet devised for separately producing the oil, gas and water directly from the wells, these three mediums are prone to come from the wells as an emulsion.

The grade of the well stream, of course, varies according to conditions, as for instance, when gas or air is injected into the well to lift the fluid it has been found that an emulsion of a very close or intimate nature occurs; this type of emulsion is difficult to treat. Also, in some cases, oil and gas and certain mineral waters or hydrogen sulphide gases are produced with the water, and in treating emulsions of this nature, a higher temperature is necessary. It is common knowledge that the higher the temperature required in treating, the more of the lighter and more valuable gases are lost to atmosphere. These losses occur through vaporization and evaporation, by heating of the lighter and higher volatiles which go to make up the gravity of the oil. Thus, it will be obvious that it is most desirable to treat these emulsions or mixtures with the lowest temperature possible.

It is one object of the invention to provide an improved method of and means for treating or separating the fluids and liquids of various grades and types of emulsions, emulsified fluids and liquids, and oil, gas and water mixtures, as well as stabilizing the oil, with low losses of desirable gases or gaseous fluids, usually due to excessive heating and agitation; as well as economical operation and more efficient dehydration of the oil.

A further object of the invention is to provide an improved method of treating oil, gas and water mixtures, particularly as they flow from the wells, wherein a preliminary or primary separation is effected to separate or extract water from the mixture, prior to any heat treating or salt water washing of the emulsion mixture, although the mixture may be preheated before the preliminary or primary dehydrating separation if desired. By this method, substantially all of the free water is first extracted and, as only the emulsion mixture remains to be treated, smaller and less expensive treaters may be used, as well as a saving in fuel effected.

Another object of the invention is to provide an improved method wherein an influent or oil, gas and water mixture, either preheated or not preheated, is subjected to a preliminary or primary dehydrating step as well as to a primary gas separating step, whereby the influent is dewatered and degasified preparatory to further treatment to extract remaining water or traces thereof.

An important object of the invention is to provide an improved method of the character described wherein the emulsion, which is preferably preheated, is discharged below the surface of the body or stratum of emulsion or emulsified liquids accumulated during the primary dehydrating or water separating step, so as to prevent undue agitation, as well as splashing, thereby avoiding the loss of valuable gaseous vapors and minimizing further cutting of the oil.

Another object of the invention is to provide an improved method of the character described wherein the emulsion stream is spread below the surface of the body of oil or emulsified liquids accumulated during the primary dehydrating step, so as to more effectively disintegrate the emulsion mixture, as well as to aid in minimizing agitation.

A still further object of the invention is to provide for the filtration of the extracted water to prevent globules of oil escaping with the water during the primary or first stage of water separation; as well as filtration of the oil during the washing or second stage dehydration step, to prevent water globules rising with the oil and to break up globules which may contain water.

Another object of the invention is to provide improved means for separating or treating oil, gas and water mixtures or emulsions including a chamber or container into which the influent or well stream is introduced and wherein a preliminary or primary separation is carried out, after which the residual fluids and liquids are conducted to means for further treating the liquids and fluids.

A further object of the invention is to provide an improved emulsion treater having means for separating gas and means for accumulating a body or stratum of oil and discharging the influent emulsion liquids into said body or stratum and spreading it therein to accelerate dehydration.

A particular object of the invention is to provide an improved presettling or separating unit or chamber equipped with means for maintaining a water level therein, as well as a water outlet, so as to define an oil space above said water level; and also provided with an oil overflow or outlet at the top of the oil space to provide a gas space thereabove, together with a gas escape leading from the gas space.

Still another object of the invention is to provide a primary separating unit or chamber having means for maintaining a water level therein and an oil outlet above the water level with a transverse filter or water extracting medium disposed across the chamber below the water level to break up the water-oil globules, whereby the water may settle and the oil rise.

A construction designed to carry out the invention will be hereinafter described, together with other features of the invention.

Figures 6, 7, 8:
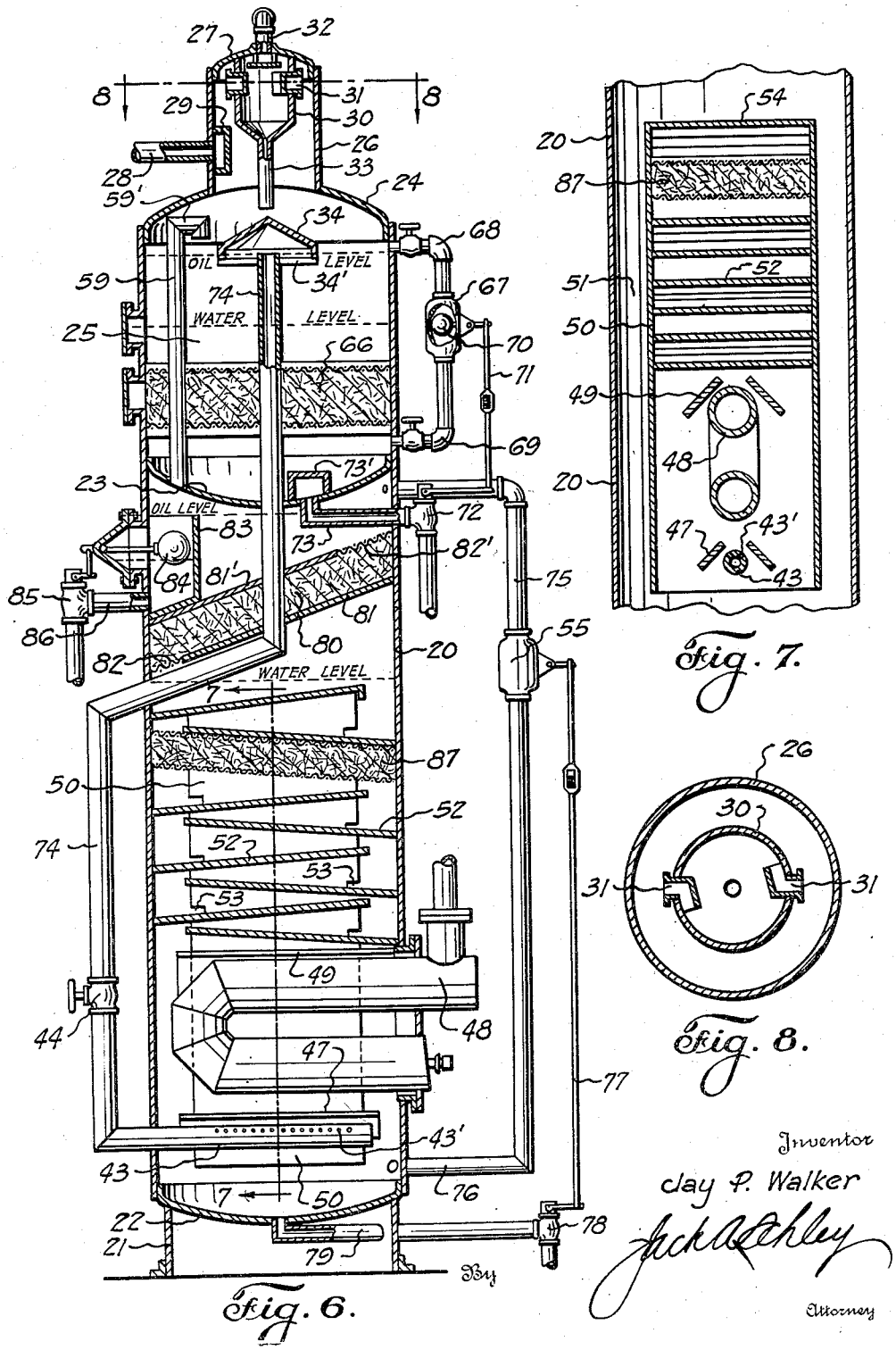
Figures 9, 10:
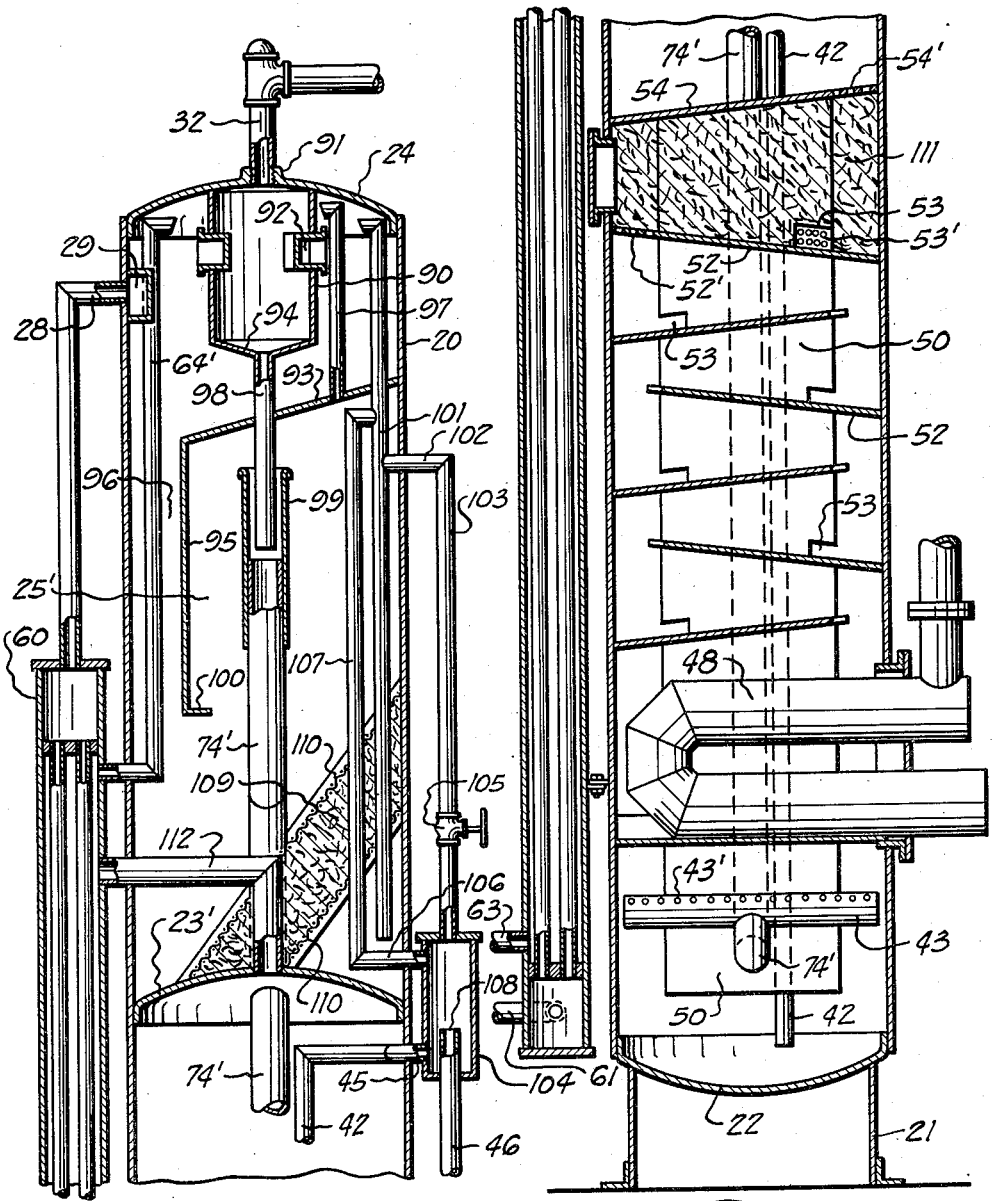

The invention will be more readily understood from a reading of the following specification and by reference to the accompanying drawings, in which an example of the invention is shown, and wherein:

Figure 1 is an elevation of a separator, constructed in accordance with the invention, Figure 2 is a vertical, sectional view of the separator shown in Figure 1, Figure 3 is a vertical, sectional view, taken at right angles to Figure 2, Figure 4 is a horizontal, cross-sectional view, taken on the line 4—4 of Figure 3, Figure 5 is a similar view, taken on the line 5—5 of Figure 3, Figure 6 is a vertical, sectional view showing a modified form of the invention, Figure 7 is a transverse, vertical, sectional view, taken on the line 7—7 of Figure 6, Figure 8 is a horizontal, cross-sectional view, taken on the line 8—8 of Figure 6, Figure 9 is a transverse, vertical, sectional view of the upper portion of a treater illustrating another form of the invention, Figure 10 is a transverse, vertical, sectional view of the lower portion of the treater shown in Figure 9, Figure 11 is a view, similar to Figure 9, showing still another form of the invention, and Figure 12 is an enlarged transverse, vertical, sectional view of the treater shown in Figure 11.

This application is filed as a continuation in part of my copending application, Serial No. 180,460, filed December 17, 1937, which was filed as a continuation in part of a copending application, Serial No. 92,903, filed July 27, 1936.

In the drawings, the numeral 20 designates an upright cylindrical tank of the usual construction such as is used in the building of separators. The tank is provided with a suitable base 21 and a false bottom 22. A dished head or partition 23 is secured within the tank near the upper end thereof, while the extreme upper end of said tank is closed by a crowned top 24. The members 23 and 24 seal off the upper portion of the tank and form a preliminary or primary separating chamber 25. The chamber 25 could be a separate container or tank.

A cylindrical column or tower 26 extends axially through the top 24 and has its upper end closed by a cap 27. The lower end of the tower extends into the preliminary separating chamber 25 (Figures 2 and 3) and has a hopper bottom 26' provided with a central outlet 27'. An inlet pipe 28 extends through the wall of the tower 26 and discharges into a diverter box 29, whereby the well stream or influent is caused to take a circumferential and helical course around the inner wall of the tower. The influent is scrubbed on the wall of the tower, whereby the liquids flow downwardly into the chamber 25, while the gaseous fluids, which are separated, rise in the tower so as to enter an axial gas separating shell 30 through inlet openings 31. The gaseous fluids or vapors are caused to whirl in the chamber, whereby the gas is liberated and the liquids are dropped out. From the gas shell 30, the gas is carried off through a suitable outlet pipe 32, which usually has a control valve (not shown). A liquid drain pipe 33 depends from the bottom of the shell and overhangs the outlet 27', so that the separated liquids are discharged into the influent liquids flowing through said outlet.

The liquids which have been primarily separated from the gas, but which may contain some gas in solution, flow from the tower 26 into the chamber 25. It is practical to eliminate the tower 26 and introduce the influent directly into the chamber 25, as is shown in my Letters Patent No. 2,181,685, issued November 28, 1939. In flowing downwardly, these liquids strike a conical spreader 34 which is suspended axially from the tower within the upper end of the chamber 25. The spreader serves to spread the liquids so that the same will fall downwardly within the chamber 25 in a sheet.

Within the separating chamber 25 is an upright partition 36, terminating adjacent the head 23 and the top 24, and located at one side to form a water box 36', open at its top and bottom. A water outlet, in the form of an elbow 37, has one arm upright in the box and the other arm extending through the side wall of the chamber and connected with a discharge pipe 40. An inclined deflector 38 depends from the top 24 to prevent the influent spray from entering the top of the water box. A drain pipe 40' including a valve 41' extends from the bottom 23 of the chamber 25.

A conductor or pipe 41 leads from the opposite side of the chamber 25 and establishes an oil level (Figure 3) below the spreader 34. The top of the elbow 37 establishes a water level in the box 36', which owing to the hydrostatic head caused by the floating oil, is higher than the water level in the chamber 25. A transverse filter 35 may extend from the partition 36 across the lower portion of the chamber below the water level. The filter may be formed of excelsior or other suitable material confined between screens or perforated partitions 39. A vent pipe 59, hereinafter referred to, extends through the bottom 23, up through the filter 35, and terminates in a hood 59', above the spreader.

The well stream or influent liquids discharging through the outlet 27' and falling upon the spreader 34 will spread and fall therefrom in a more or less circumferential sheet which will have a tendency to liberate gas and to spread out the water-oil globules. The oil will tend to float and rise while the water will settle or precipitate. Those water-oil globules or droplets which reach the filter will be broken up in attempting to pass therethrough, whereby the water will pass through the filter and the oil will float and rise to the oil zone above the water level. As the water settles in the main chamber 25, it will rise in the box 36 and discharge through the outlet elbow 37.

The water and oil levels in the chamber 25 will define water, oil and gas spaces or zones therein. It is pointed out that the major portion of the gas is separated from the influent in the tower 26. The remaining liquids, with some gas in solution, then pass into the primary separating chamber 25 where a major portion of the water is separated. However, all the water does not settle out in the chamber 25 and, thus, the liquids entering or overflowing into the pipe 41 comprise oil with, perhaps, some gas in solution, and some water admixed therewith, which is an emulsion mixture requiring further treatment.

While gas is separated in the chamber 25, the gas might be previously extracted or, if no gas separation was necessary, the gas separating step could be omitted. The principal step is the extracting of the water. By carrying out a primary water separation or dehydration, the following steps of the method are simplified and a much lower temperature may be used, thus preserving in the oil the lighter and more volatile fractions which enhance its gravity and usually its value.

The influent may be preheated, if desired, and any suitable device may be used for the purpose. A preheater 60, similar to that shown and described in my Letters Patent No. 2,181,685, may be employed. In this device the oil, gas and water mixture enters through an inlet pipe 61 at the bottom and flows upwardly through the tubes (not shown) to the top of the preheater. The inlet pipe 28 is connected to the top of the preheater. A hot oil discharge or outlet pipe 62 extends from the tank at the oil level and connects to the upper portion of the preheater, whereby the hot oil flows down around the tubes and escapes through an outlet 63. The counterflowing influent and oil undergo a heat exchange, whereby the influent is preheated and the oil is cooled. A gas escape pipe 64 connects the oil space of the preheater with the tank above the oil outlet. A gas escape pipe 65 may lead from the preheater.

The pipe 41 extends downwardly in close proximity to the outer surface of the tank. At its lower end the pipe 41 is connected to one end of a horizontal nozzle 43 which extends diametrically across the tank, as is best shown in Figure 3. A suitable manually controlled valve 44 may be connected in the pipe 41 on the outside of the tank, whereby the flow of liquid or fluid through said pipe may be readily controlled, but the valve is not essential to the invention. The nozzle 43 is usually placed a suitable distance above the bottom 22, to provide a water settling and collecting space therebelow, in which extraneous matter may also deposit. This nozzle preferably has longitudinal rows of perforations 43' on its upper side so as to discharge the liquid mixture upwardly in numerous small streams. The tank contains a body of water, usually salt water, up to a certain level which is maintained by a syphon pipe 42 (Figure 2), vented at its upper end. This pipe takes water from the bottom of the tank and has an outlet pipe 45 connected thereto and extending through the wall at a point above the water level because of the hydrostatic head in the tank. A water leg or discharge pipe 46 is connected to the pipe 45. This is a common construction and no claim is made thereto.

Any suitable washing or dehydrating means may be used in the tank and may be either wholly or partially immersed in the body of salt water for separating the water from the oil. I have illustrated a unit or separator similar to that shown in my Letters Patent No. 2,181,688, wherein the body of salt water is heated and the mixture discharged from the nozzle 43 is baffled upwardly therethrough to extract and precipitate the water from the mixture.

In the drawings, inclined baffles 47 are shown above the nozzle and a return-bend firebox 48 is mounted across the tank just above said baffles in alinement with the nozzle. The small upwardly flowing streams are directed by the baffles against the bottom of the lower leg of the firebox and flow upwardly on each side thereof, whereby they are heated. Similar inclined baffles 49 overhang the firebox and keep the upwardly flowing streams in heating contact therewith. It is within the scope of the invention to heat the body of salt water by any suitable means or to supply heated salt water to the tank. Any suitable heating element may be introduced into the lower leg of the firebox.

The skirts of a vertical housing 50 extend on each side of the firebox and nozzle, whereby vertical passages or ducts 51, open at their upper and lower ends, are formed with the wall of the tank. Above the firebox, staggered upwardly inclined cross baffles 52 are mounted in the housing and may have their free ends serrated to divide upwardly flowing liquids into numerous small streams. Water draining openings 53 are provided in each side wall of the housing near the lower ends of the baffles 52. As the heated mixture flows upwardly, the baffles will wash out the entrained water which is admixed with the oil and discharged from the nozzle 43. The water which is washed out will tend to run down the upper sides of the baffles and drain through the openings 53 into the passages 51.

By the time the mixture reaches the top 54 of the housing, the entrained water will be substantially washed out of the oil and water mixture and the clean oil will rise and float upon the body of water up to the oil level. The water which drains into the passages 51 flows downwardly and cools, finally admixing with the water in the bottom of the tank, whereby the water is recirculated as described in the aforesaid Letters Patent.

Above the housing 50 and just below the oil level, an inclined filter 57 is mounted across the tank. This filter may be similar to the filter 35, being formed of top and bottom screens 58 between which excelsior or other suitable filtering material is confined. The oil will readily pass through this filter, but oil-water globules will be broken up and droplets of water will be excluded. The filter may be omitted if desired. It will be noted that the filter 35 is below the water level and this permits the water which is substantially free from oil to settle through the filter; while the filter 57 is above the water level and only oil-water globules and water droplets suspended in the oil will engage this filter.

The heated oil will give off more or less vapors or gaseous fluid, but not to the extent as where a high temperature is employed in the dehydrating unit. These vapors will rise and, upon contacting the partition 23 or bottom of the separating chamber 25, some of them will condense, the condensate falling back into the oil and enriching it. In this manner, rich vapors which would otherwise be lost are saved and remixed with the oil. The gas outlet pipe 64 extends from the tank above the oil outlet 62 and below the partition 23. Gas and gaseous fluids which are not condensed may escape through this pipe which may have a suitable valve (not shown) therein; or gas and vapors may flow up through the pipe 59, depending upon the pressure differentials. When the hot gaseous fluids, such as vapors are discharged into the chamber 25 they will rise into the tower 26 and mingle with cold or colder gas or gaseous fluids therein, whereby liqueflable fractions entrained in such rising vapors will be condensed and the condensates will fall back into the chamber 25 and admix with the strata of oil therein, thus enriching and/or using the gravity of such oil.

Briefly, in operation, the influent is brought through the inlet pipe 28, either direct from the well or other source, or from the preheater 60. The influent is discharged into the diverter box 29 in the tower 26, whereby it is whirled around the tower on the inner surface thereof. This circumferential action scrubs out a considerable amount, possibly the major portion of the gas; some gas, however, will remain in solution. The liberated gas and gaseous fluids rise and enter the shell 30, through the inlets 31, wherein they are whirled and the liquids are scrubbed out. These liquids drain through the pipe 33, mix and pass with the influent liquids through the outlet 27'. The admixture falling upon the spreader 34 will be spread and fall therefrom in a circumferential sheet, which will tend to further liberate gas and to promote the separation of oil and water, particularly such water as is not emulsified with the oil.

As before described, the water, oil and gas stratify in the chamber 25, the filter 35, if used, breaking up the oil-water globules and water droplets. This primary, or preliminary separation of water is an important feature of the invention. Preheating may be very helpful in some instances. The invention is not dependent upon the separation of gas in either the tower or the chamber 25, because the gas may be previously separated. The opening 27' is large enough to permit gas to flow up therethrough to the tower and escape by way of the shell 30 and pipe 32; or gas may enter the pipe 59 and flow down into the tank below the head 23, depending upon the pressure differential. Gas may flow from the tank up through said pipe into the chamber 25.

The water extracted in the chamber 25 flows into the box 36' and overflows into the elbow 37, from which it escapes by way of the pipe 40. The oil and water mixture flows out through the pipe 41 and downwardly in said pipe until it enters the nozzle 43. At this point it is discharged from the perforations 43' and is baffled upwardly through the body of heated salt water to extract water from the influent. The upwardly flowing mixture is heated by contacting the lower leg of the firebox 48 and then will pass upwardly through and around the baffles 52, whereby substantially all of the remaining entrained water will be washed out. The hot oil rising above the housing 50 will pass through the filter 57 and any water-oil globules or water droplets accompanying the oil will be excluded by said filter.

In Figures 6 and 7, a modified form of the invention is shown and this form includes the upright tank 20 with its members 20—33, inclusive, with slightly modified form of spreader 34a.

A transverse filter 66, similar to the filter 35, is disposed entirely across the lower portion of the chamber 25. A float casing 67 has its upper end connected with the upper end of the chamber 25 by a pipe 68. The lower end of said float casing is connected by a pipe 69 with the lower end of the chamber. A pivotally mounted float 70 is located within the casing 67 and this float is exteriorly connected by a suitable linkage 71 with a water outlet valve 72, whereby the said float is subjected to the fluid within the chamber 25. The valve 72 is connected in a water outlet pipe 73 which leads from the bottom 23 of the chamber 25, and thus it will be seen that when the level rises beyond a predetermined point, the float will actuate the valve 72 to permit the escape of the water within the lower end of the chamber 25. An inverted U-shaped guard 73' is mounted on the bottom 23 over the inlet to the pipe 73.

The spreader 34a overhangs the upper end of an oil discharge pipe 74 and is supported by arms 34'. When the oil rises in the chamber, it will overflow into the upper end of the pipe 74, whereby an oil level will be maintained. The pipe 74, which takes the place of the pipe 41 in the preferred form, extends downwardly from the head 23 to the midportion of the tank where it is offset so as to extend outwardly through the wall of the tank and downwardly in close proximity to the outer surface of the tank. The pipe 74 has the manually controlled valve 44 connected therein on the outside of the tank and has its lower end connected to the nozzle 43. The mixture discharged from the perforations 43', provided in the nozzle 43, will flow upwardly past the firebox 48, the inclined baffles 47 and 49 and the staggered cross baffles 52, which are mounted within the housing 50.

Under most operating conditions, the water level within the tank will stand some distance above the top of the housing 50, while the oil level will stand some distance above the water level as is shown in Figure 3. For controlling the water level within the tank, a float valve 55 is mounted exteriorly of the tank. The upper end of the float housing is connected by a pipe 75 to the upper end of the tank just below the dished head 23. The lower end of the float housing is connected by an angular pipe 76 with the lower end of the tank just above the false bottom 22. The weight of the oil on the water within the tank will force the water upwardly through the pipe 76 to the float chamber and, thus, by positioning the float at any given height on the outside of the tank, a water level in alinement with said float may be maintained. The float is connected through a suitable linkage 77 with a water outlet valve 78, which valve is connected to a water outlet pipe 79 leading from the false bottom 22. It is obvious that actuation of the float will operate the water outlet valve 78 and thereby control the water level within the tank.

Within the tank, and located above the housing 50, is a transverse filter 80. The filter is similar to the filter 57 of the preferred form and may be disposed at a greater inclination within the interior of the tank. The greater portion of the underside of said filter is covered by a solid plate 81 whereby liquid may not pass upwardly through this portion of the filter. The lower plate 81 is provided with one or more openings 82 at its lowermost end. The liquids, predominantly oil, flowing upwardly within the tank will enter the filter 80 through the opening 82 and flow upwardly through the filtering material toward the upper end of said filter; and any entrained water which has not been previously precipitated will thus be separated from the flow liquids. The flowing liquids will escape through an opening 82' in the uppermost end of the top plate 81', which plate is otherwise solid. Any water which is caught by the filter will flow downwardly toward the lower end thereof, where it will escape through the opening 82 in the plate 81 and thus be returned to the lower end of the tank.

A catch box 83 is mounted on the wall of the tank adjacent the lower end of the filter 80. This box has a float 84 operating therein and this float controls an oil outlet valve 85 which is connected in an oil outlet pipe 86. The oil which passes upwardly through the filter 80 will overflow into the catch box 83 and, when the level reaches a predetermined point, the float 84 will be actuated to open the outlet valve 85 and permit the escape of oil from the tank.

It has been found that in some cases, where a well is producing a great quantity of water that the filter 66 in the chamber 25 and the filter 80 in the tank 20, together with the treating unit, are not sufficient to separate all of the water from the emulsion. In such cases, it would be desirable to mount a second filter 87 within the tank 20 at a point below the top of the housing 50. This filter will be constructed similarly to the filter 80 and is preferably located just below one of the upper inclined cross baffles 52. As is clearly shown in Figure 6, the provision of this filter would cause the mixture travelling through the housing 50 to pass completely through the filter 87, whereby all the water or a greater portion thereof within the mixture would be filtered therefrom. It is noted that although some cases necessitate the use of this third filter, there are other cases where both the filters in the tank 20 could be eliminated.

This invention differs primarily from the invention disclosed in my Letters Patent No. 2,181,685 (the application upon which said patent issued having been co-pending with the parent application of which the present application is a continuation-in-part), in the preliminary separation of the water and the filtering of the liquids. These are details. The operation in the tank below the chamber 25 is substantially the same as in said Letters Patent.

In Figures 9 and 10, I have shown another form of structure involving the invention herein. The tower 26 is not used and instead a cylindrical scrubbing shell 90 is centrally suspended from the crowned top 24, to which it may be secured by welding or in any other suitable manner. This shell forms a gas chamber and the top 24 has a collar 91 into which the gas discharge pipe 32 is screwed. In order to whirl the gaseous fluids entering the shell, it is provided with louvers 92 having tangential outlets within the shell and flanged inlets on the outside of the shell, such louvers being well known and illustrated at 19 in my Reissue Letters Patent No. 17,983, and also in my Letters Patent No. 1,755,527.

The influent inlet pipe 28 enters the side of the tank opposite the shell 90 and the diverter 29 is employed as in Figures 2 and 6, whereby the influent is whirled around the upper portion of the tank 20 on the inner surface of the wall thereof. A shield or deflector 93 having an inclined top is mounted in the tank just below the hopper bottom 94 of the shell. This shield has a depending skirt or apron 95 directed downwardly from the edge of its inclined top and spaced from the wall of the tank to form a passage or channel 96. The shield has a two-fold purpose in that the influent liquids are caught in its inclined top and scrubbed during their downward flow (to release gas) and stratified liquids below the shield are protected against undue agitation.

A gas equalizing pipe 97 extends from the top of the shield to the upper end of the tank. A drain pipe 98 extends from the bottom 94 of the shell through the top of the shield and telescopes the upper end of an overflow sleeve 99 of somewhat larger diameter. The sleeve is mounted for vertical adjustment on the upper end of a conductor or down pipe 74' similar to the pipe 74. A chamber 25', similar to the chamber 25, is segregated by a crowned partition or head 23' which is the inverse of the bottom 23 having its upper side convex instead of concaved. The pipe 74' extends through this head, but is deflected so as to pass through the head axially off-center.

The gas separates from the influent upon entering the chamber 25', like it does in the chamber 25. The gaseous fluids flowing upwardly enter the gas chamber through the louvers 92, wherein they are given an additional scrubbing to release entrained gas. The gas escapes by way of the pipe 32 while the liquids drain through the pipe 98. The influent, after whirling around the tank, brings its liquids to the inclined top of the shield 93. The liquids flow down the shield through the passage 96. On the lower end of the apron 95 is an inwardly directed flange 100 under which the influent liquids flow. When the influent liquids reach this point, much of the gas has been scrubbed out and the water and oil are ready for stratification. The oil stratifies above the water, as hereinbefore described, and the oil level under the shield may be regulated by vertically adjusting the sleeve 99.

For discharging the water from the primary or first stage separation, an upright overflow pipe 101 is mounted at one side of the chamber 25'. The lower end of the pipe terminates adjacent the head 23' while the upper portion extends through the top of the shield and terminates near the top 24. This pipe is divided into a water leg and a gas leg, a lateral 102 leading from the intersection of the two legs through the side of the tank. A down pipe 103 leads from the lateral to a water syphon box 104 and includes a regulating valve 105.

A gas vent pipe 106 extends from the upper end of the box through the wall of the tank and connects with a gas riser 107 within the chamber 25'. The riser connects at its upper end with the gas leg of pipe 101. The pipes 42 and 45, as shown in Figure 2, are connected to the lower end of the syphon box 104, which box is located at an elevation adjacent the oil level in the lower chamber of the tank. The box has an upright overflow nipple 108 therein and this is connected to the water discharge pipe 46. By the syphonic hook-up, water is discharged from the upper and lower chambers of the tank by way of the single pipe 46. It will be seen that gas is vented not only through the pipe 106 and riser 107, but also through the upper area of the lateral 102 and the gas leg of the pipe 101. By making the nipple 108 adjustable, predetermined liquid levels in the lower chamber of the tank may be maintained.

In order to break up oil globules and prevent oil thus being carried out with the water, an inclined filter 109 is disposed at one side of the chamber 25', so as to have its lower end resting on the head 23' and its upper end engaging the tank wall. This filter is similar to the filter shown in Figure 2 and includes upper and lower foraminous plates 110 which confine therebetween a filling of fibrous material such as excelsior, shavings (metal or wood), mineral wool and the like. The inlet to the overflow pipe 101 is below the filter. By inclining the filter, it extends substantially through the body of water accumulated in the first stage separating chamber 25', instead of merely transversely therethrough, thus tending to deflect the oil particles upwardly and amplifying its filtering field.

The influent inlet pipe 28 in Figures 1 and 9 is connected to a preheater 60. A gas bleeding or venting pipe 64' extends from the gas chamber of the preheater into the chamber 25', through the wall of the tank and thence upward in the passage 96. The upper end of the pipe terminates adjacent the top 24. This pipe primarily conducts gas rising from the hot oil in the preheater to the upper portion of the gas separating chamber 25', but under certain pressure conditions gas may flow down this pipe.

The lower chamber of the treater is similar to those already described and, where elements are substantially like those previously described, the same reference numerals will be used. The pipe 74' is carried down through one of the passages 51 of the tank instead of outside thereof and connects to the center of the nozzle 43. A filter 111 is arranged in the upper end of the housing 50 between the top baffle 52 and the top plate 54 of the said housing. Between these elements 52 and 54, filtering material, similar to the material used in the filter 109, may be employed. The top baffle plate has a perforated section 52' at its upper end which extends to the tank wall and the outlets 53 from the filter to the passages 51 are covered by screens 53' to prevent escape of the filtering material. The upper end of the top plate 54 also has a perforated extension 54'.

Because of the water syphon arrangement and the hydrostatic head of washed oil, the line of demarcation between the oil and water transects the filter, so that the upper portion of said filter is immersed in the oil. The function of the filter is to break up liquid globules so as to prevent water being carried upwardly into the body of oil.

A discharge pipe 112 leads from the center of the head 23' out through the wall of the tank to the preheater 60; whereas, in Figures 2, 3 and 6, a cooling space is provided between head and the oil level, no such space is maintained in the structure shown in Figure 9. However, there is a cooling zone, because the upper stratum of oil contacts the relatively cool head 23' and some of the gaseous vapors flowing with the oil are released. These released gases and any free gas flow with the oil out through the pipe 112. There may be some condensing of gaseous products in the pipe 112, and by increasing its diameter, considerable condensation might be obtained. The hot oil and gas discharge into the preheater and the gas escapes through the pipe 64'.

Hot gaseous fluids or vapor will flow up pipes 91 and 64' and discharge into the upper portion of the gas chamber below the top 24, whereby such hot gaseous fluid will mingle with the cold or colder gas and/or gaseous fluids in said chamber as in the chamber 25, with the same results.

It is quite desirable to stratify the liquids in the primary separating chamber with as little agitation as is feasible and, in Figures 11 and 12, I have shown a form of treater for achieving this result. In many respects, it combines the features of the forms previously described, and where possible the same reference numerals will be used for elements previously described. The tower 26 is similar to that shown in Figure 2; however, the tower is lowered so that its lower end and the elements 26' and 34 are constantly immersed in the body of partially washed oil in the chamber 25. By discharging the influent below the surface of this oil or liquid body, the surface thereof is not broken and agitation and churning are reduced to a low phase which is substantially negative. This result is facilitated by the spreading and more even distribution of the influent in the quiescent body of liquids. This teaching may be applied to any of the forms previously illustrated.

By employing the syphonic water discharge of Figures 9 and 10, a lower water level may be carried; the zone of demarcation transecting the filter 35. The gas riser 107 (Figure 9), instead of entering the chamber 25 and connecting with the gas leg of the overflow pipe 101, is extended into the tank below the head 23 so that its upper end terminates in the gas space below the said head. Of course, if the inverted head 23' is used, the syphon arrangement will have to be similar to Figure 9. Where two-stage washing is not employed, the chamber 25 may be shortened. The down pipe or conductor 74' with its level adjusting sleeve 99 is moved to one side, but extends down through one of the passages 51. Any of the filtering arrangements which have been described may be used.

There are a number of important and distinct advantages in the treaters herein described and in the methods practiced. The treater actually acts as stabilizer, conditioning the crude oil for storage without the loss of valuable hydrocarbons. Readily condensible hydrocarbon vapors which are driven off by heat are returned to crude oil. To a great extent, lighter hydrocarbon fractions (those which usually cannot be held in storage) are drawn off with the gas, as by way of pipes 59, 64, 65, 64' and 32, and the gas thus acquired may be used or carried to a gasoline plant.

By preheating the influent to the proper degree F. (a temperature of 160° F. having been obtained by heat exchange with the hot oil) the influent is efficiently prepared for primary separation and two-stage washing or water extraction. This preheating not only releases quantities of gas, but also causes water to more readily separate from the oil.

Gas is a disturbing element and, by releasing and scrubbing out the gas before admixing the influent with previously washed oil and water, a great advantage is had. Gas agitation will tend to tighten an emulsion and bubbling gas through a mixture of oil and water aggravates this condition. So far as I am aware, no method of preheating the influent, separating the gas prior to admixing with previously separated liquids or any liquid, then extracting water as a primary or preliminary step and then washing the dehydrated oil in a body of heated water, has been disclosed prior to my invention, particularly as a continuous method. More or less free water flows with the influent, due to condensation during the upstream flow from the reservoir and from other natural causes; therefore, early extraction of this water is highly desirable. Aside from the step of first extracting free water without treating or washing the emulsion mixture, and subsequent heating and breaking up the emulsion mixture in an efficient and economical manner, as hereinbefore set forth, the method and apparatus includes all of the advantages and features set forth in my Letters Patent No. 2,181,685, supra. The stabilization of the treated oil, by the condensation of the hydrocarbon vapors and/or gaseous fluids, the admixing of the hot and cool gases and/or gaseous fluids, and the various other steps as set forth in said Letters Patent are important adjuncts in the method and apparatus which has been described.

What I claim and desire to secure by Letters Patent is:

1. In an oil well emulsion treater, the combination of a tank having a cross partition therein dividing said tank into an upper primary water extracting chamber and a washing chamber thereunder, a shield in the upper chamber having a passage at one side thereof, an influent inlet above said shield whereby said shield deflects the influent liquids, a water outlet extending from the lower portion of the upper chamber and having a gas vent, means for carrying off separated gas from the upper chamber, means for controlling the discharge of water from the upper chamber for stratifying water and oil therein under said shield, an oil conductor below the shield extending downwardly from the oil stratum in the upper chamber to maintain an oil level in said chamber and for conducting oil to the washing chamber, the washing chamber having a body of heated water therein, means for conducting oil from the washing chamber, and means for conducting water from the washing chamber.

2. A separator for oil emulsion mixtures including, a liquid container, a tower mounted upon the container and communicating at its lower end therewith, means for introducing the emulsion mixture into the tower, means in the tower for separating gas from the mixture, means for carrying off the separated gas, means above the liquid level in the container for receiving residual liquids from the tower and spreading the same in the container, means in the container for maintaining a water level therein, means for maintaining an oil level in the container above the water level, means for carrying off separated water from the container, a conductor connected with the container for carrying off oil, a tank receiving oil from the conductor and containing a body of heated water, means for conducting the oil through said body of water to extract further water from said oil, means for maintaining a water level in said tank, means for carrying off oil from said tank, and means for carrying off water from said tank.

3. In an oil, gas and water separator, the combination of, an upright structure including a tank having a top and a bottom with a transverse partition spaced below its top to form a liquid receiving chamber and a tower on the top having its lower end opening into the chamber, an influent inlet in the side wall of the tower, a gas conductor leading from the upper end of the tower, a conical spreader in the chamber in the path of the liquids descending from the tower, a water discharge conductor extending from the chamber for carrying off water, an oil conductor extending from the chamber to the lower end of the tank, means in the tank receiving oil from the conductor and distributing it in said tank, means in the tank for washing the oil to further separate water therefrom, means for carrying off water from the tank, and maintaining a water level therein, and means for carrying off washed oil from the tank at a point above the water level therein.

4. The method of continuously treating oil well emulsion fluids in a closed system while flowing from a well which includes, taking off gas at a temperature lower than that at which the emulsion mixture is subsequently heated, then taking off free water from the emulsion mixture in a zone free from added heat at a temperature lower than that to which said mixture is subsequently heated, then heating the residual emulsion mixture to a higher temperature to break up the emulsion, carrying off the washed oil, carrying off the water, and commingling the hot gaseous fluids rising from the washed oil with the previously separated cool gas to condense the heavier ends of the hydrocarbons which exist in vapor phase in the hot gaseous fluids, and admixing the hydrocarbon condensates with the oil to enhance the gravity thereof.

5. In the type of continuous closed system of treating oil emulsion streams wherein gas, oil and water are separated in a primary stage, and the remaining emulsion mixture is washed in a body of hot water in a secondary stage, the improvement which includes taking off gaseous vapors at various points in the progress of the method and commingling the gas and gaseous vapors to condense hydrocarbon fractions, and admixing the hydrocarbon condensates with the oil to enhance the gravity thereof.

6. The method of continuously treating oil well emulsion streams flowing from oil wells which includes, flowing the components of the well stream through a closed system to prevent the escape of hydrocarbon bearing condensible vapors to the atmosphere, and first separating free gas from the stream in a closed area prior to contacting the liquids of the stream with well liquids, collecting the liquids from which gas has been separated in substantially quiescent strata in a closed area, separately carrying off water from the water stratum, carrying off emulsified oil from the oil stratum and introducing it into a body of heated water, flowing the said oil through said body of water to wash it, carrying off surplus water from said body of water, collecting the washed oil in an area closed to the atmosphere, condensing hydrocarbon vapors rising from said collected oil and admixing the condensates with said oil to enrich the same, and carrying off the enriched washed oil.

7. The method of continuously treating oil well emulsion fluids as set forth in claim 6 with the step of flowing the washed oil in heat exchange relation with the well stream and introducing the stream thus preheated into the gas separating area without otherwise heating the said well stream.

8. The method of continuously treating oil well emulsion fluids as set forth in claim 6 with the step of scrubbing the gas in the gas separating area and admixing the liquids which are scrubbed out with the emulsified oil.

9. The method of continuously treating oil well emulsion fluids as set forth in claim 6 with the step of filtering the water in the confined area in which the water is first stratified to break up oil globules and prevent oil escaping with this water.

10. The method of continuously treating oil well emulsion fluids as set forth in claim 6 with the step of filtering the washed oil to break up liquid globules.

11. The method of continuously treating oil well emulsion fluids as set forth in claim 6 with the step of controlling and obstructing in the confined area the flowing of the stratified water therefrom to prevent oil escaping from said area with the water.

12. The method of continuously treating oil well emulsion fluids as set forth in claim 6, with the steps of collecting the washed oil in close proximity to the stratified water and oil, and passing the gaseous vapors rising from said washed oil in heat exchange relation with the stratified water and oil to condense such vapors, whereby the condensate gravitates to the emulsified oil.

13. The method of continuously treating oil well emulsion fluids as set forth in claim 6 with the step of commingling the hot gaseous vapors rising from the washed oil with the colder gas separated and accumulating in the gas separating area above the stratified oil for condensing such vapors, and admixing the condensate with the emulsified oil.

14. The method of continuously treating oil well emulsion fluids which includes, flowing the entire influent well stream into a confined area and primarily separating therein gas from the water and emulsified oil, then collecting the water and emulsified oil in a substantially quiescent state, then separating free water from the emulsified oil and separately carrying off such water, overflowing the emulsified oil and flowing it in close proximity to a body of hot water, whereby the emulsified oil is preheated, washing the emulsified oil in a body of hot water, collecting the hot washed oil in a confined area closed to atmosphere, whereby the hot gaseous vapors rising from the hot oil are preserved, flowing the gaseous vapors to the gas separation stage and intimately mixing the hot vapors with the colder gas to condense the former, whereby the condensate gravitates to the emulsified oil.

15. In an oil well emulsion heater, an upright tank having a gas chamber at its upper end provided with a gas outlet, a partition in the tank forming a chamber communicating with the gas chamber for stratifying water and emulsified oil, an influent inlet above the liquid levels in the stratifying chamber whereby gas separating from the liquids may flow into the gas chamber and liquids may flow down into the stratifying chamber, means for separately carrying off water from the water stratum and the stratifying chamber, upright partitions in the tank spaced from the first named partition, a body of heated water between said partitions, a heater for heating said body of water, means for overflowing emulsified oil from the stratifying chamber and conducting it to the lower portion of the body of heated water, whereby the emulsified oil flows upwardly through said body and is washed, the tank having provision for collecting the washed oil in a body closed to the atmosphere, means for conducting hot gaseous vapors arising from the oil into the gas separation chamber for admixing such vapors with the separated colder gas, the vapors being exposed to the gas and/or gaseous vapors rising from the emulsified oil.

16. In an oil well emulsion treater, an upright tank having a gas separating chamber at its upper end closed to the atmosphere, an oil and water collecting chamber in the tank, a well influent inlet above the oil and water collecting chamber communicating with the gas chamber, a partition in the tank extending below the inlet for conducting the emulsified oil and water to the collecting chamber, means for carrying off water from the collecting chamber, a body of washing water in the tank, a partition between the collecting chamber and the body of water, means for overflowing the oil in the collecting chamber and conducting it to the body of water, a heater for heating said body of water, and an oil outlet in the wall of the tank, whereby a body of washed oil is maintained in the tank, the gas separating chamber having communication with the body of washed oil, whereby hot gaseous vapors rising from said washed oil may pass into the said chamber and admix with the gas therein.

17. In an oil well emulsion treater, the combination of a tank having a cross partition dividing said tank into an upper primary water separating and gas collecting chamber and a lower washing and oil collecting chamber, means for stratifying water and emulsified oil in the water separating chamber, means for discharging separated water from the separating chamber, an influent inlet above the strata of oil and water, a conductor extending from the oil stratum of the separating chamber to the lower portion of the washing chamber, means for maintaining a body of water in the washing chamber, whereby a body of oil is collected on said body of water, a heater in the washing chamber immersed in said body of water, and means for conducting hot gaseous vapors from the body of collected oil into the separating chamber above the oil stratum.

18. An oil well emulsion treater as set forth in claim 17 with means in the separating chamber below the influent chamber and below the influent inlet for breaking the fall of and spreading the oil and water, whereby they stratify with less agitation.

19. An oil well emulsion treater as set forth in claim 17 with a filter disposed in the water separating chamber between the oil outlet and the water outlet to break up oil globules and prevent oil escaping with the water.

20. An oil well emulsion treater as set forth in claim 17 with a filter in the tank below the cross partition in the path of the washed oil.

21. An oil well emulsion treater as set forth in claim 17 with a preheater having a well stream inlet and an outlet connected with the influent inlet, the preheater having connection with the oil outlet of the tank and provided with a passage for circulating the hot oil therethrough.

22. An oil well emulsion treater as set forth in claim 17 with a cut-off valve mounted in the water discharge of the separator chamber, and a float actuated by water separated in the chamber and connected to the water valve for opening and closing the same and for maintaining a predetermined water level in the chamber.

23. In a portable oil well emulsion treater, a single upright tank having a closed gas separating space at its upper end, said tank being movable as a unit, an influent inlet adjacent said gas space, a chamber in the tank immediately below the gas space and also below the inlet, said chamber having means for stratifying oil and water and for discharging water therefrom, means for conducting liquids from the inlet to the stratifying chamber, a washing chamber below and under the gas space and within said tank, means within the tank for conducting oil from the stratifying chamber to the washing chamber, and heating means in the washing chamber, there being communication between the stratifying chamber and the gas space and between the washing chamber and the gas space, whereby gas and/or gaseous vapors may rise within the tank from both of said chambers and flow into the gas space and commingle with the cooler separated gas therein to cause liquifiable components to be liquified and admixed with the stratified oil.

24. In an oil well emulsion treater, a single upright tank having a closed gas separating space at its upper end, a stratifying chamber having a horizontal bottom in the upper portion of the tank below the gas space, an influent inlet above the liquid level of said chamber, an upright partition at one side of said chamber having an inlet to admit water from the chamber, a water outlet leading from said water space defined by said partition, a conductor leading from the upper portion of said chamber for conducting emulsion therefrom to the bottom of the tank and for maintaining a stratum of emulsion liquid in said chamber, means for discharging water from the lower portion of the tank and for maintaining a body of water therein, the conductor discharging the emulsion into the lower portion of said body of water, whereby said emulsion is caused to flow upwardly through said body, means for heating said body of water, an oil outlet in the side of the tank below said horizontal bottom, whereby an oil level is maintained below said horizontal bottom so that gaseous vapors arising from said oil may be cooled upon contact with said bottom and liquefiable hydrocarbon components are condensed and fall back into the oil.

25. In an oil well emulsion treater, an upright tank closed at its top and bottom, a gas outlet leading from the top of the tank, upper and lower water outlets leading from the tank, a horizontal partition between said water outlets, the tank having an influent inlet at the upper end of the tank, means above the partition co-acting with the upper water outlet for controlling the discharge of water and for maintaining a stratum of water on said partition, a conductor leading from the tank above the said water stratum co-acting with the water outlet control means and below the influent inlet for maintaining a stratum of emulsion on said stratum of water and for conducting the overflow of emulsion to the bottom of the tank, the lower water outlet having means for maintaining a body of water in the tank, means for heating said body of water, the conductor discharging emulsion into the lower portion of the tank, means for baffling the emulsion flowing upwardly through the body of water, and an oil outlet below said partition and above said lower water outlet located to maintain a stratum of heated washed oil below said portion.

26. In an oil well emulsion treater, a single upright, portable tank closed at its top and bottom and having an influent inlet at its upper end, means for carrying off gas from the top of the tank, means for maintaining upper strata of water and emulsion in said tank and also lower strata of water and oil spaced from the upper strata in said tank to provide a condensing space therebetween, means for separately carrying off water from each water stratum, means for conducting emulsion from the upper strata to the water stratum of the lower strata, means for heating the lower strata, and means for carrying off oil from the oil stratum.

27. The method of continuously treating oil well emulsion fluids which includes, first flowing the well stream into a closed area and therein separating free gas from the influent prior to contacting the liquids of the influent stream with liquids, stratifying the liquids of the influent from which gas has been separated in a closed area and reducing the liquids to a substantially quiescent state, filtering the water passing to the water stratum to break up oil globules, discharging water from the water stratum, overflowing emulsified oil from the oil stratum and discharging it into a body of heated water, flowing the oil upwardly through said body of water to wash said oil, collecting the washed oil on the body of water in a closed area, condensing hydrocarbon vapors rising from the washed oil and admixing the condensates with the washed oil to enrich the same, whereby said condensates are preserved, and carrying off the enriched oil.

28. The method as set forth in claim 27 with the step of preheating the influent, whereby the amount of heat required for the heated body of water is reduced.

29. The method of continuously treating oil well emulsion streams which includes, flowing the stream from a well, conducting the stream into a closed area and therein separating gas from the influent prior to contacting it with liquids, flowing by gravity emulsified oil from which gas has been separated and under a sufficient hydrostatic head to cause it to flow upwardly through a body of heated water, flowing the emulsified oil upwardly in dispersed order through a body of heated water, carrying off washed oil, carrying out a two stage separation of water from the emulsified oil, each at a different point, utilizing the washed oil to preheat the influent stream, carrying off surplus water, condensing vapors rising from the washed oil and mixing the hydrocarbon condensates with the washed oil, whereby the recovered oil is enriched thereby.

30. The method of continuously treating oil well emulsion streams flowing from a well which includes, flowing the components of the well stream through a closed system to prevent the escape of hydrocarbon bearing condensible vapors to the atmosphere, first flowing the well stream into an area closed to the atmosphere and therein separating free gas from the influent prior to contacting the liquids of the influent with liquids, then stratifying in an area closed to the atmosphere influent liquids from which gas has been separated, carrying out the stratification of said liquids in a substantially quiescent stage to give free water opportunity to settle from the stratified liquids, carrying off water from the water stratum, conducting emulsified oil from the oil stratum and discharging it into a body of heated water, flowing the emulsified oil upwardly through said body of water to wash said oil, collecting the washed oil in a stratum upon said body of water and in an area closed to the atmosphere, carrying off surplus water from the washing stage, carrying off washed oil from the washed oil stratum, and condensing hydrocarbon vapors and admixing the condensates with the oil in said closed systems, whereby hydrocarbon components are preserved and recovered with the washed oil.

31. In an apparatus for treating oil well emulsion streams, the combination of a primary separating chamber having an inlet for the well stream, means in the chamber for separating gas from the influent, means for collecting oil and water in the chamber below the inlet, means for carrying off water from the chamber, means for carrying off oil from the chamber at a point below the inlet, a washing receptacle having a closed vapor condensing space at its upper end, means for discharging water from the receptacle and maintaining a body of water therein, means for discharging the oil from the chamber into the lower portion of the body of water, means for dispersing and baffling the oil as it flows upwardly through the body of water, means for heating the body of water, means for carrying off oil from the receptacle below the condensing space thereof, whereby condensates from the condensing space are admixed with the oil, and means for carrying off water from the receptacle at the lower portion of the body of water therein.

32. In an apparatus for treating emulsion well streams flowing from oil wells, the combination of means for separating gas from the well stream in a separate enclosure, means for conducting the well liquids from which gas has been separated to an enclosure closed to the atmosphere and therein separating water from the emulsified oil, a washing chamber closed to the atmosphere, the enclosure and the washing chamber being enclosed in a single tank and disposed one above the other, a partition extending across the tank and separating the enclosure from the chamber, the chamber having a body of water therein, means in the chamber for heating said body of water, means for discharging emulsified oil from the enclosure into the body of water in said chamber, means in the body of water in said chamber for baffling the oil flowing upwardly therein, means for discharging the washed oil from the chamber, means for carrying off water from the enclosure, and means for carrying off water from the chamber.

33. An apparatus for treating emulsion well streams flowing from oil wells as set forth in claim 32 with a preheater connected with the washed oil discharge and having means for flowing the washed oil therethrough, said preheater having a well stream inlet and means for discharging the well stream to the gas separating means, whereby the well stream flows in heat exchange relation with the washed oil.

JAY P. WALKER.